W. E. SHORE.
AUTOMATIC DRAFT REGULATING MECHANISM FOR FURNACES.
APPLICATION FILED MAR. 20, 1915.

1,365,349.

Patented Jan. 11, 1921.

Witnesses
L. B. James
Frank S. Brenton

Inventor
William E. Shore,
By Titian Johnson
Attorney

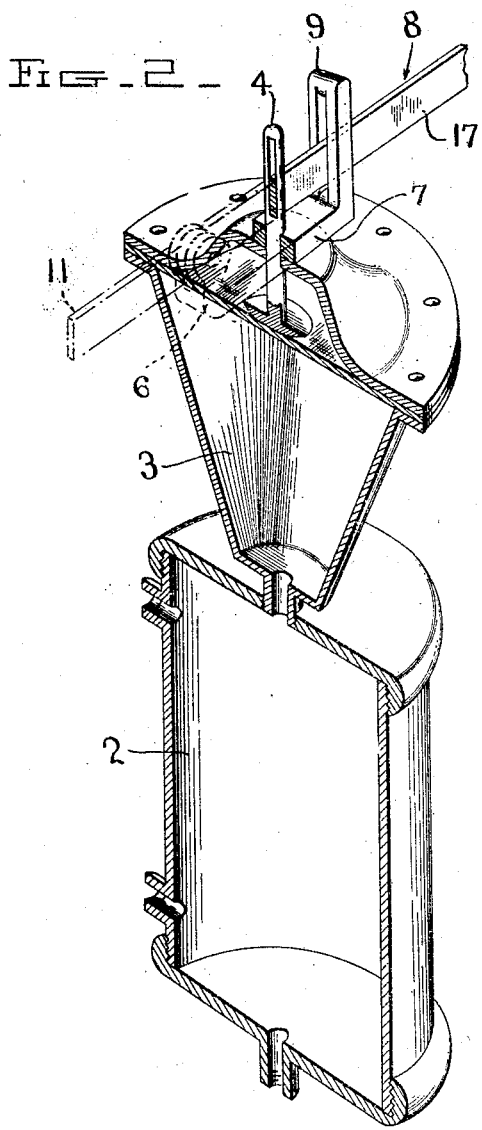
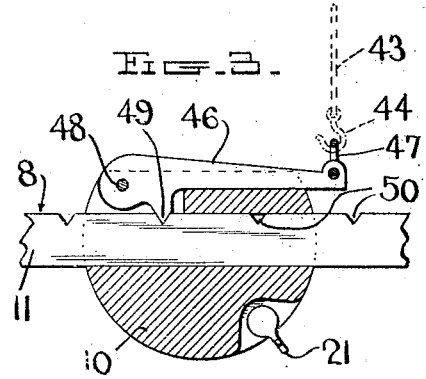
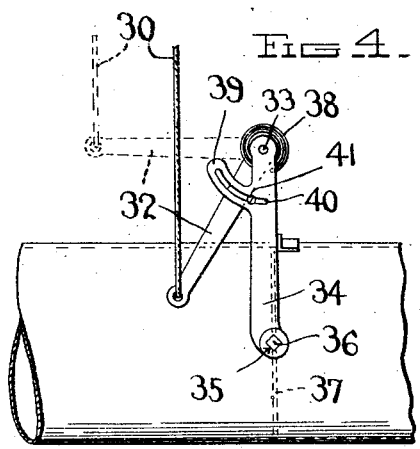
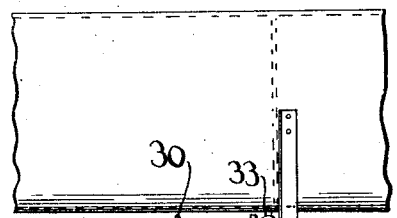
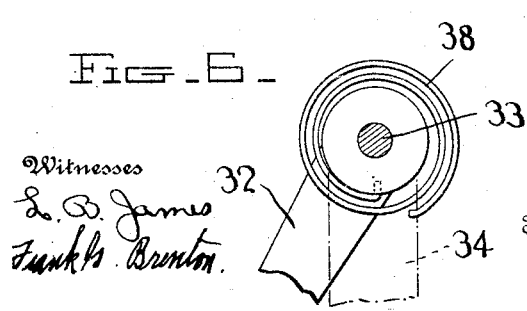

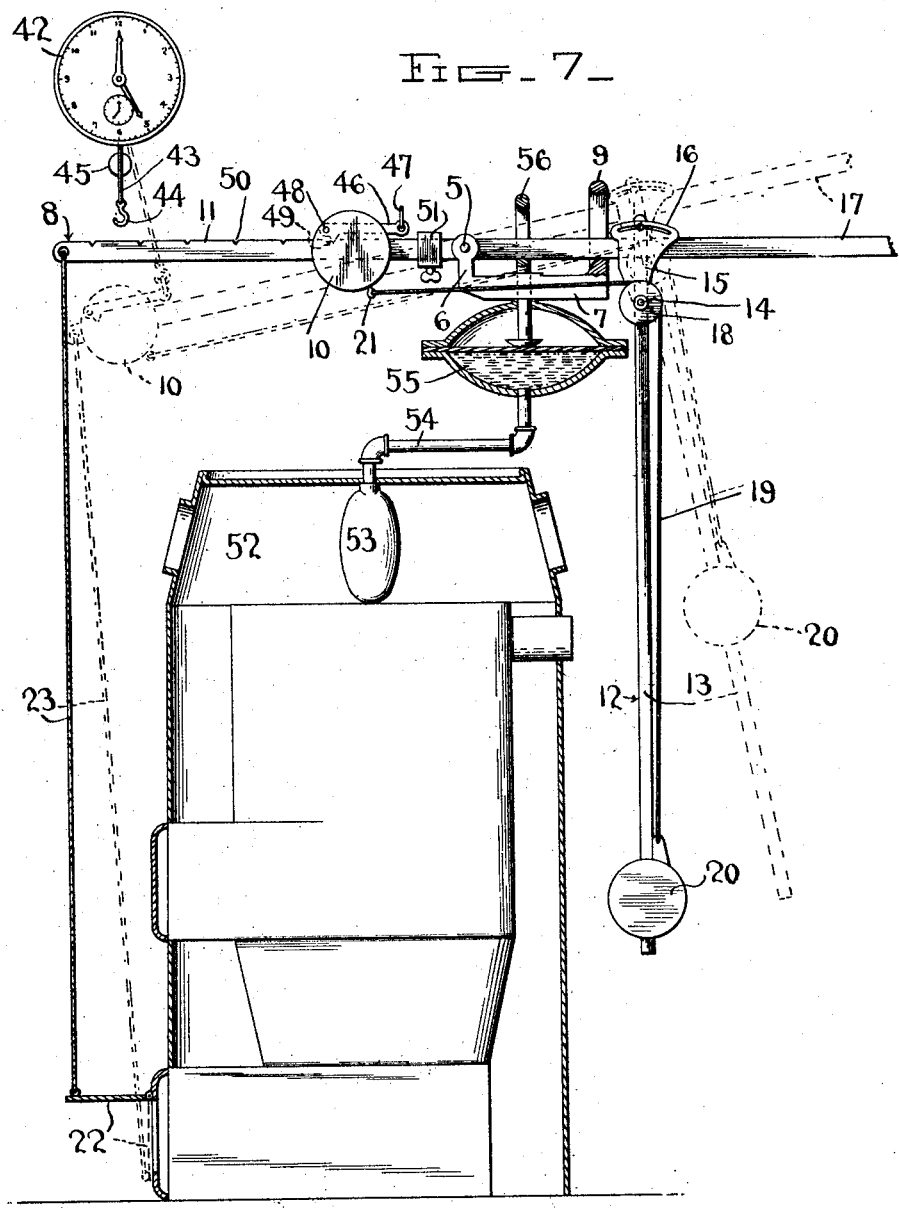

W. E. SHORE.
AUTOMATIC DRAFT REGULATING MECHANISM FOR FURNACES.
APPLICATION FILED MAR. 20, 1915.
1,365,349.
Patented Jan. 11, 1921.
5 SHEETS—SHEET 4.
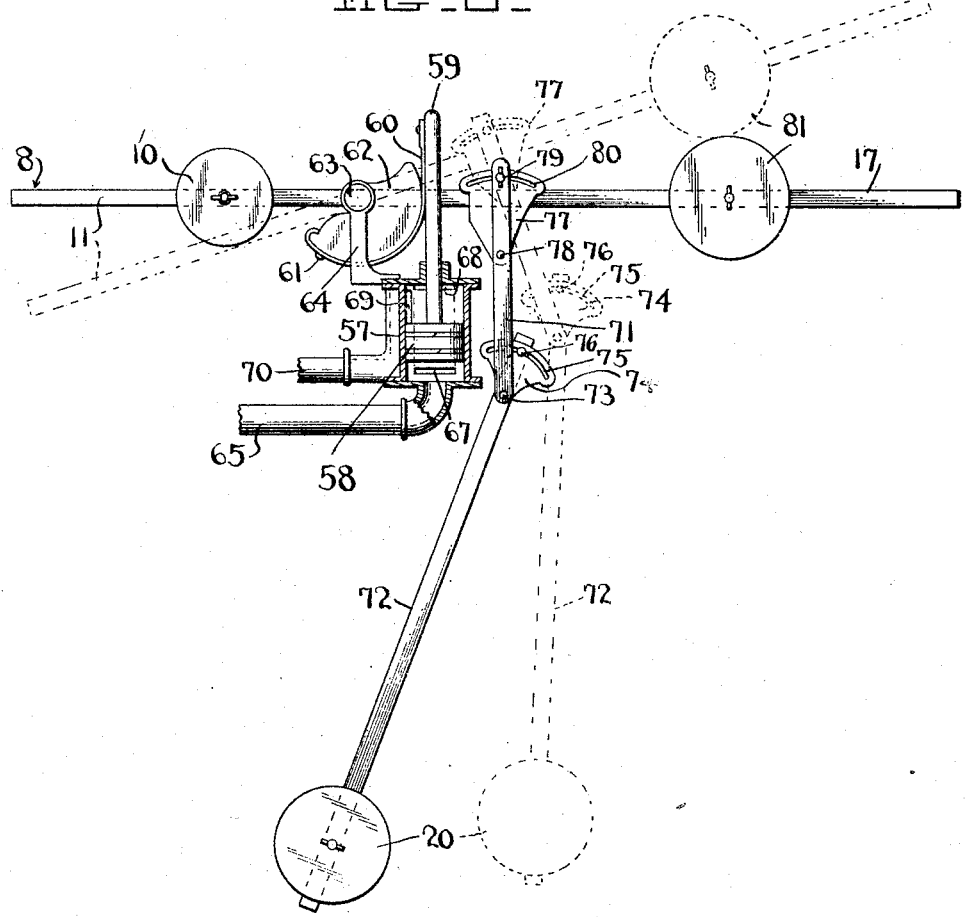
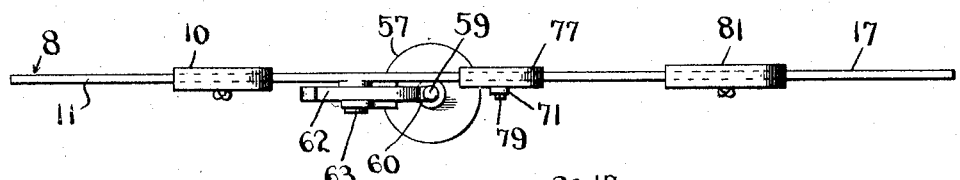
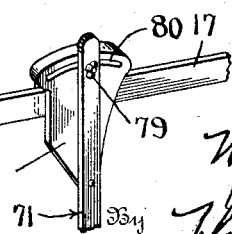

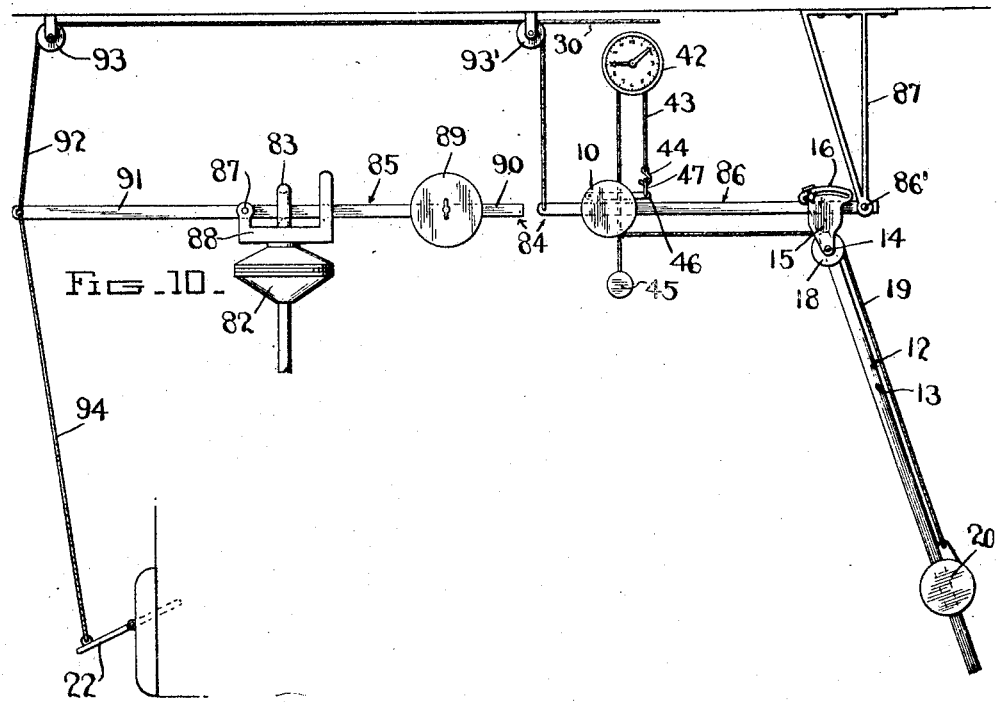

UNITED STATES PATENT OFFICE.

WILLIAM E. SHORE, OF NEW YORK, N. Y., ASSIGNOR, BY MESNE ASSIGNMENTS, TO JOHN F. BLANCHARD.

AUTOMATIC DRAFT-REGULATING MECHANISM FOR FURNACES.

1,365,349.   Specification of Letters Patent.   Patented Jan. 11, 1921.

Application filed March 20, 1915. Serial No. 15,950.

*To all whom it may concern:*

Be it known that I, WILLIAM E. SHORE, a subject of the King of Great Britain, residing at New York, in the county of New York and State of New York, have invented certain new and useful Improvements in Automatic Draft-Regulating Mechanism for Furnaces, of which the following is a specification.

This invention relates primarily to improvements in automatic draft regulating mechanisms for furnaces.

While the invention is particularly applicable to furnaces, either steam, hot water, or hot air, it may, nevertheless, be employed to advantage in other fields, including high pressure steam boilers; compressed air or vacuum systems; or to the regulation of reducing valves in steam, air or vacuum pressure systems; or for maintaining even velocities of air or fluid, passing under pressure, from the tanks, reservoirs, mains, pipe lines, etc.

The invention will be described, with the exception of particular reference to two modifications, in relation to a steam furnace.

Heretofore, steam furnace drafts have been controlled by levers, cords, etc., similar in part to the mechanism shown in the drawings, that is to say, they have in common, a bar or lever acted upon by a diaphragm rod, actuated from a diaphragm chamber and weights placed upon the lever, one on each side of the fulcrum, one or both of said weights being adapted to be moved to and from the fulcrum point, so that a given steam pressure will lift the bar, through the diaphragm rod, and close the dampers. This system has many disadvantages, which it is my purpose to overcome. In all cases, so far as I am aware, in the old system of operating the dampers, etc., by a pressure of any kind, the operation is too quick, in fact, it might be said to be instantaneous, because the instant that the pressure has reached a predetermined point or tilting point of the lever, it shuts off the furnace too abruptly.

When, in the old system, the operating lever or balance bar is in horizontal position, the weights are at their greatest distance from the center of the fulcrum, or leverage center, for any predetermined or desired operation, and the moment the lever moves upward past the horizontal position, the distance of the counterpoise weight has become less from the fulcrum center. Therefore, when the pressure has reached a point that moves the balance lever out of a horizontal position, it has overcome the leverage balance, and even with the fraction of an ounce of pressure beyond that for which it has been set, the lever suddenly lifts and cuts off the furnace drafts. After the fire has died down somewhat, by reason of lack of draft, the steam suddenly falls below the set or predetermined pressure point. When this occurs, the counterpoise weight causes the balance lever to lower again suddenly, on the counterpoise weight side, and permits another and sudden inrush of air.

With my improvements, the balance lever is always accurately balanced, at all angles, thus I am able to control in fires, the fluctuations that result from ordinary usages, to a great nicety, and also to prevent fluctuations caused by changing draft velocities in stacks, due to varying winds, and other causes, or the change of heating area, due to shutting off or opening radiators, etc. The opening and closing of dampers, in the old system, is done so suddenly, and erratically, that the fire is abnormally affected, either in generating excessive heat at one time, or losing it at another, thus allowing the steam either to go higher than the predetermined or set point, or to disappear altogether.

Therefore, the primary object of my invention is to provide a mechanism, whereby it will be possible, in a furnace to open and close the dampers gradually, the operating lever being perfectly balanced at any and all angles, within the range of its movement, to control the opening of the dampers to an infinitesimal degree, thereby controlling the steam pressure absolutely, within a fraction of an ounce. Indeed, experiment has shown that the damper operating mechanism is more sensitive than the gage, the movement of the dampers being perceptible before a reading is made possible upon the gage.

Another object of the invention, is to provide a means by which, in combination with an ordinary time mechanism, the furnace drafts can be completely closed at night, for instance, and operated by said mechanism at a predetermined time, to restore the balance lever to a predetermined balanced angle that will render it possible to generate from zero, gradually, a given steam pressure, as the result of consuming exactly enough fuel to generate such pressure, there being no possibility of using either an unnecessary amount of fuel, or generating an excessive amount of steam.

In the construction about to be described, the weights are both adjustable toward and from the fulcrum point of the balance lever, and the counterpoise weight is so constructed and arranged, that the relative positions of the centers of gravity of the weights of the fulcrum of the balance lever remain the same at all angles of said lever.

Other objects and advantages of the invention will become apparent from the following description.

In the drawings—

Fig. 2 is a perspective sectional view of the steam column, and diaphragm pressure chamber.

Fig. 3 is a sectional view of one of the weights, showing the weight lock and balance lever in elevation.

Fig. 4 is a detail elevation of the damper arm.

Fig. 5 is a top plan view of same.

Fig. 6 is a detail view showing the manner of connecting the two portions of the damper arm.

Fig. 7 is a sectional view of a furnace showing a pressure reservoir therein, adapting the mechanism for use in connection with a hot air furnace;

Fig. 8 is a view showing the mechanism applied to a reducing valve.

Figure 1:
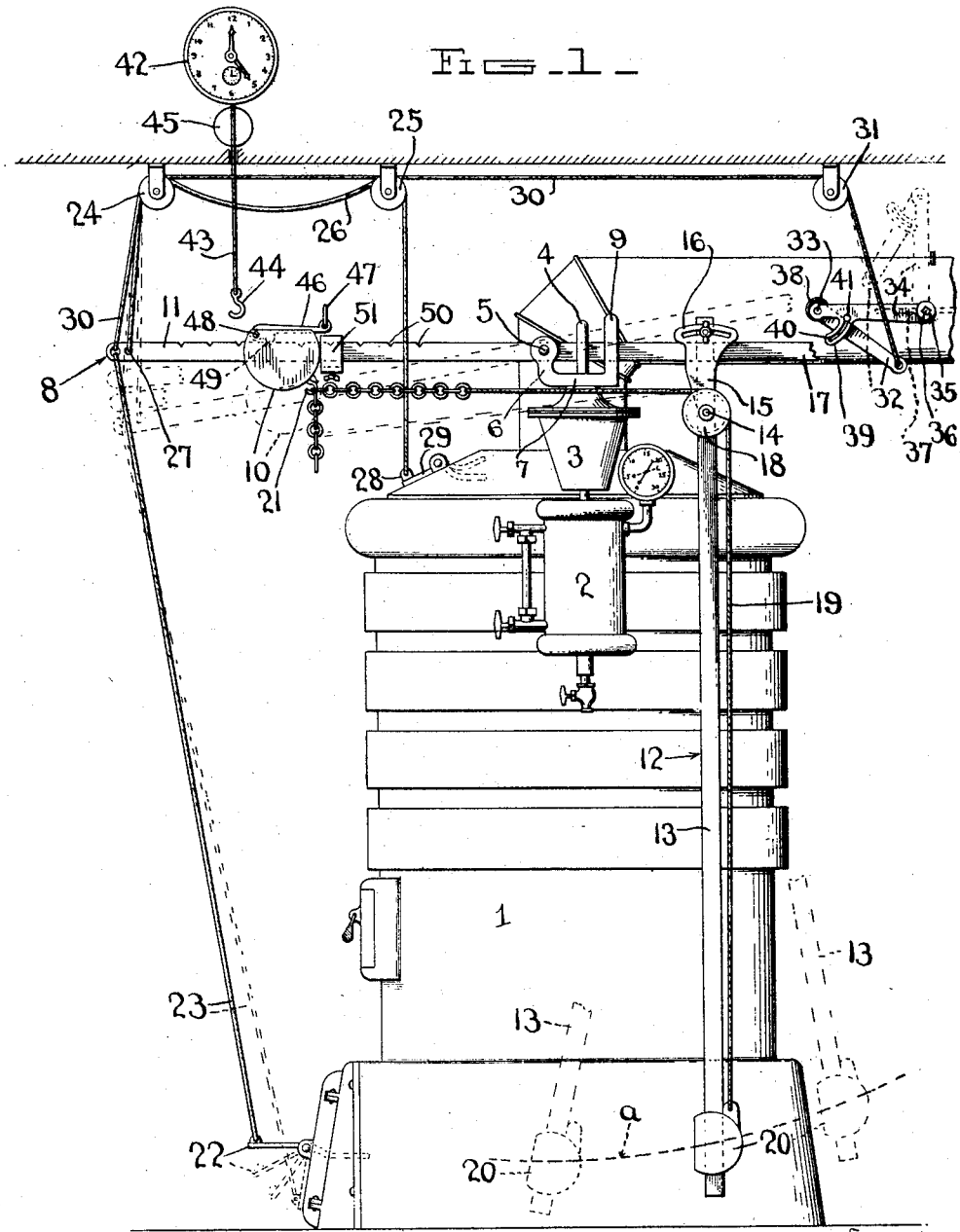
Figure 1 is a side elevation of an ordinary steam furnace, with the preferred embodiment of my invention applied thereto.

Fig. 8ᵃ is a plan view of the balance lever, and parts carried thereby.

Fig. 9 is a detail perspective view of the upper end of the counterpoise weight, showing the means whereby the counterpoise bar may be adjusted to any angle with relation to the balance lever.

Fig. 10 is a side elevation of a modified form, adapted for use where there is not sufficient room to place the mechanism on the furnace, enough of the mechanism being shown to illustrate this particular application.

Referring to the drawings, the numeral 1 designates a steam furnace of ordinary construction; 2 designates the steam column, and 3 the diaphragm pressure chamber, in which works vertically, the slotted diaphragm rod 4. Fulcrumed at 5, upon the upwardly extending arm 6 of the bracket 7, is the balance lever 8. The bracket 7 is further provided with another slotted arm 9, through which one arm of the lever extends, as is usual.

The numeral 10 designates a weight movable on the arm 11 of the balance lever, and the numeral 12 designates what, as a whole, may be regarded as the compensating weight. This weight comprises a pendulous rod 13 pivoted at 14 to the lower arm 15 of a segment 16, slidable and adjustable on the arm 17 of the balance lever. At the pivotal point 14 of the rod, and segment, I provide a pulley 18, over which passes a cord 19, connected at its lower end with a sliding weight 20, and at its upper end, said cord may be connected, as the exigencies of the case may require, and as will be presently described, to a hook 21 carried by the weight 10.

The numeral 22 designates the ash-pit damper to which is attached a cord 23, whose upper end is connected with the end of the arm 11 of the balance lever. Above the furnace and secured to the ceiling or rafters, or any other convenient place, are two pulleys 24 and 25, over which passes a cord 26, with one end connected at 27, to the arm 11 of the balance lever, and the other end connected at 28, to the check damper 29. Connected with the end of the arm 11 of the balance lever is another cord 30, which passes over the pulleys 24 and 25, and over another pulley 31 whence it extends downwardly and is attached to an arm 32 pivoted at 33, to the damper arm 34. The damper arm is provided with a squared opening 35, which fits over the squared end of a damper rod 36, secured in the usual way, to the stack damper 37, best shown in Fig. 4. The arm 32 is so connected with the arm 34, that the arm 32 can have a movement independent of the arm 34. Interposed between the two arms is a coil spring 38 tending to constantly force the arm 32 to the position shown in Fig. 4, relative to the arm 34, which arm 34 is provided with a curved ear 39 having therein a slot 40, for the reception of a pin 41 carried by the arm 32, the slot being closed at both ends, so as to limit the movement of the arm 32 in both directions.

The numeral 42 designates a clock, which may be of any approved construction, of which there are several upon the market, for operating furnace dampers. This clock has the usual cord 43, to which, in the present instance, I attach the hook 44, and the clock is further provided with the usual weight 45, intended, when the clock mechanism is tripped, to overcome the resistance necessary to be overcome in operating the dampers. I adapt the weight 10 for operation in connection with this clock mechanism, by providing the weight with a trigger 46, having a ring 47 in one end, the trigger being pivoted at the other end at 48 and provided with a tooth 49 adapted to enter one or the other of the notches 50 in the upper edge of the arm 11 of the balance lever. In conjunction with this weight, I employ an adjustable stop 51 which, under conditions which will be described in the operation, limits the sliding movement of the weight 10 toward the fulcrum, and determines the relative position of the weight 10 to the compensating weight 12, in any predetermined and desired balanced position of the lever, with reference to the amount of steam to be generated and controlled.

The operation of the structure thus far described, is as follows:

It will be noted that the sliding weight 20 is at its lowermost position on the bar 13, and that the hook 21 is in engagement with one of the links of the chain at the end of the cord 19. This, however, is in this position merely for the convenience of supporting the end of the cord, and so far as the first operation is concerned, this cord might just as well be disconnected, since the weight 20 has no effect upon the weight 10 in the position illustrated. We will assume that the positions of the weight 10, and the compensating weight 12 accurately balance the balance lever 8 in the horizontal position shown, with a new view, and all drafts opened, and the gage at zero, and it is desired to generate five pounds of steam. As the steam is generated in the column, it passes to the diaphragm chamber in the usual way, and through the diaphragm slowly raises the diaphragm rod 4. This gradual movement of the diaphragm rod is imparted to the balance lever very gradually, and causes the arm 11 to slowly descend, and the arm 17 to slowly rise, which obviously will, through the cords 23 and 30, respectively, lower the ash pit damper 22, and correspondingly move the damper 37 in the stack toward their closed positions. This movement of the balance lever continues, gradually cutting off the drafts until a five pound pressure is recorded on the gage, at which moment, the ash pit door and damper in the stack, will be brought to positions to admit just enough draft to maintain the pressure, but never to exceed it.

It will be noted that during this downward movement of the arm 11 of the balance lever, the weight 20 moving on the arc $a$ moves away from the fulcrum center, thus increasing the leverage in proportion to the increasing pressure, thereby balancing the lever, with dampers closed or sufficiently so, to maintain a predetermined pressure.

Assume that the fire is banked for the night, and no steam is desired. Under these conditions, the weight 10 is manually moved toward the end of the arm 11 of the balance lever 8, until the end of the trigger 49 enters the last recess in the arm. This movement of the weight 10 along the lever, will pull the weight 20 up the rod 13, for a distance corresponding to the distance the weight 10 has been moved, and the weight 10 greatly overbalancing the weight 12, will completely close the ash-pit door and the stack damper. The hook 44 is then placed in the eye 47 and the clock set, to be tripped, say for six o'clock in the morning. When the clock mechanism operates, it will, through weight 45, raise the trigger 46, and release the weight 10, which weight, under the influence of the greater weight of the compensating weight, and the weight 20, will be drawn quickly along the lever until its movement is arrested by the stop 51, in which position the parts will be in accurate balance with the dampers open to the desired extent which obviously permits a draft sufficient to generate a predetermined steam pressure. In manually moving the arm 11 of the balance lever to its lowermost position, the stack damper will have been closed, through the cord connection 30, but after the closing of the stack damper, it is desired to bring about a movement that will open the check damper 29. The downward movement of the arm 11 will take up the slack in the cord 26, during the initial downward movement of the lever, and by the time it has reached its lowermost position, it will have lifted the check damper and also closed the stack damper, and the member 32 of the damper arm 34 will have gone to the position shown in dotted lines, Fig. 4, against the tension of spring 38, tensioning the cord 30, but causing no further movement of the stack damper, the stack being provided with a stop to prevent the damper from passing vertical position, in one direction.

Referring particularly to the modification shown in Fig. 7, the numeral 52 designates the upper part of a furnace, which may be either hot air, or hot water type. The numeral 53 designates a reservoir which may be placed in the flue of the furnace, as shown, or in any suitable part of the furnace, and may contain mercury, liquid, or any material adapted to be expanded by heat. This reservoir is connected by a pipe 54, to a diaphragm chamber 55, through which the vertically movable diaphragm rod 56 is adapted to be operated. The mechanism otherwise, is precisely the same as that first described, and it will be understood that the pressure is controlled in the diaphragm chamber by the expansion of the contents of the reservoir 53.

Referring to the modification shown in Fig. 8, the numeral 57 designates a cylinder which may be of any approved construction, which cylinder is fitted with a piston 58 having connected therewith a piston rod 59, corresponding to the diaphragm rods heretofore referred to in the description of the main figures. This rod extends through the head of the cylinder, and has connected to its upper end, a flexible strap 60, whose lower end is connected at 61 to a segment 62. The segment is pivoted at 63 in a bracket 64 secured to the cylinder head. The balance lever 8 is also fulcrumed at the point 63. The numeral 65 designates a high pressure pipe which communicates with the interior of the cylinder, through the ports 67 and 68, communicating with the cylinder below and above the piston. The numeral 69 designates an exhaust port communicating with the low pressure pipe 70. The compensating weight in this modification is slightly different from the construction shown in Fig. 1, in that it is made in two sections 71 and 72, the section 72 being pivotally connected at 73 to the upper section. The upper end of section 72 is provided with a segment 74 which has therein a slot 75 for the reception of the stud 76 carried on the upper end of the section 72, the position of said stud relative to the outer edge of the section 71, determining the angle of the lower section to the upper section. The upper section is provided with a segment 77 which is pivotally connected at 78 to the upper section 71 and the upper end of the section carries a set screw 79 which works in a slot 80 in the upper segment, so that the angle of the section 71 with relation to the segment can be varied, if found desirable.

The numeral 81 designates an additional counterpoise weight which is carried by the arm 17 of the lever 8. This weight may be made movable upon said bar, but usually remains in a fixed position, the difference in balance between the weight 10, and the counterpoise weight 81, being compensated for by the intermediate compensating weight. The square inch area of the under side of the piston is more than on top, and say for instance that the pressure in the cylinder is one hundred pounds, the difference is enough to force the plunger upward, which movement, through the piston rod, acts upon the balance lever 8. Variation of pressure between the top and bottom half of the cylinder causes a corresponding movement of the piston, or the opening or closing of the exhaust port accordingly. When the piston moves upward in the cylinder, the balance lever moves off the horizontal line, and cuts off the exhaust accordingly, and when it descends, the exhaust port is gradually opened, thus regulating, to a great nicety, the amount of air, steam or fluid, that passes through the cylinder from the high pressure pipe to and out of the low pressure pipe. Such an arrangement is applicable to a built in vacuum cleaner system.

Referring particularly to Fig. 10, the numeral 82 designates a diaphragm chamber in which works, diaphragm rod 83. In this construction, the balance lever, which is indicated by the numeral 84, is made in two parts, 85 and 86. The part 85 is fulcrumed at 87 in bracket 88 on the diaphragm chamber, and extends through the slot in the upper end of the diaphragm rod. The part 86 is pivoted, as shown at 86' to a bracket 87'. The numeral 89 designates a counterpoise weight which is carried by the arm 90 of the part 85 of the lever and to the opposite arm 91 of said lever is attached to one end of a cord 92, which passes over pulleys 93 and 93' suitably supported in the ceiling, the other end of this cord being attached to the outer end of the part 86 of the lever. The weight 10 is carried by the part 86 of the lever, as shown, and also the compensating weight 12. The numeral 94 designates a cord attached to the arm 91 of the lever part 85, which cord extends to the ash pit damper 22.

In operation, when the diaphragm rod moves upward, the arm 91 of the lever part 85, will be depressed and through the cord 92, will move the lever part 86 a corresponding distance, the lever part 85 rocking upon its fulcrum 87 and the lever part 86 rocking upon the pivot 86', upon a bracket 87', supported in the ceiling at some convenient point adjacent to the furnace.

Having thus fully described my invention, what I claim is:—

1. In combination with the dampers of a furnace, and a pressure operated device associated with the furnace, a fulcrumed lever operated upon by the pressure operated device, an adjustable weight operated upon one arm of the lever, and means for locking said weight in set position, a suitable stop for limiting the movement of said weight toward the fulcrum of the lever, a compensating weight operating directly upon the other arm of said lever, connections between the two weights, whereby when the first weight is moved from the fulcrum, the second weight is overbalanced, connections between the balance lever and the furnace dampers, whereby said dampers are closed in the over balanced position of said lever, and mechanism for releasing the first weight from said position, at a predetermined time, to permit said weight to move toward the fulcrum of the balance lever to restore the balance of said lever to permit the opening of the dampers.

2. In a mechanism of the character described the combination with a furnace, dampers thereof, and a pressure operated means, of a fulcrumed lever operated upon by the pressure operated means, a compensating weight operating directly upon the lever, upon one side of the fulcrum and a weight operating upon the lever upon the other side of the fulcrum, the second weight being adapted to serve both as a counterbalancing weight and also as an overbalancing weight, connections between the weights, means for actuating the second weight at predetermined times, to permit it to move automatically to counterbalancing position, for the purpose set forth, and connections between the balance lever and the dampers, whereby when said second weight is moved to counterbalancing position, the dampers will be opened.

3. In a mechanism of the character described, in combination, a furnace, dampers thereof, and pressure operated means, of a fulcrumed balance lever operated upon by the pressure operating means, a compensating weight comprising an adjustable depending arm, the said arm being adjustable to and from the fulcrum, an adjustable balancing weight operating upon the balance lever on the other side of the fulcrum, the said weights being so arranged with relation to each other and to the fulcrum that the equilibrium between the weights will be maintained in all angular movements of the balance lever, and connections between the balance lever and the dampers, whereby said dampers are gradually operated to increase or diminish the furnace drafts upon the movement of said balance lever.

4. In a mechanism of the character described, in combination, a furnace, the dampers thereof, a pressure operated means, of a fulcrumed lever operated upon by the pressure operated means, a compensating weight operating upon the lever upon one side of the fulcrum, said lever comprising an adjustable arm having a slidable weight thereon, a second counterbalancing weight adjustable upon the balance lever on the other side of the fulcrum, the second weight being adapted to be moved to overbalance the compensating weight, connections between the balancing lever and the furnace dampers, connections between the sliding weight on the arm of the compensating weight and the second counterbalancing weight, mechanism operating upon the second weight to permit it to be moved on the balance lever through its connections with the weight on the compensating weight, to restore the balance of the balance lever, and a suitable stop for limiting the movement of the second weight.

5. In a mechanism of the character described, the combination of a pressure controlling means, a pressure operated device, operating means consisting of a fulcrum balance lever, a weight operating on one side of the fulcrum and a compensating weight connected directly to the balance lever and angularly offset, and acted upon only by its connection with the balance lever to balance it in all angular positions thereof, by reason of the automatic operation of the center of gravity of the compensating weight, according to the varying pressure exerted upon the balance lever by the pressure operated device.

6. In a mechanism of the character described, the combination with a pressure operated device and means for enabling the control of the pressure, of operating means associated with the controlling means, consisting of a fulcrumed balance lever, a weight operating upon one side of the fulcrum, and a compensating weight connected directly to the balance lever and angularly offset and acted upon only by its connection with the balance lever, the compensating weight being so mounted that its center of gravity will be automatically varied to and from the fulcrum point, according to the pressure exerted upon the balance lever, whereby said lever is balanced in all angular positions.

7. In a draft regulating mechanism for furnaces, in combination, a furnace, dampers, a pressure operated device having a reciprocating element, of a fulcrumed balance lever, a weight operating upon one side of the fulcrum, and a compensating weight connected to the balance lever at the other side of said fulcrum, and acted upon only by its connection with the balance lever, connections between the balance lever and the reciprocating element of the pressure device, the compensating weight being so mounted upon the balance lever that its center of gravity will be automatically moved to or from the fulcrum according to the movement of the element of the pressure device, whereby the balance lever will be balanced in all angular positions thereof and suitable connections between the balance lever and the furnace dampers, whereby they are gradually opened or closed, according to the movement of the balance lever.

8. In a mechanism of the character described, in combination, a furnace, dampers therefor, and pressure operated means, of a fulcrumed balance lever operated upon by the pressure operating means, a compensating weight comprising a depending arm disposed on one side of the fulcrum, said arm being connected directly to the balance lever and adjustable angularly, the compensating weight being acted upon only by its connection with the balance lever, a balancing weight operating upon the balance lever, on the other side of the fulcrum, the said weights being so arranged with relation to each other and to the fulcrum, that the equilibrium between the weights will be maintained in all angular movements of the balance lever, and the dampers, whereby the latter are gradually operated to increase or diminish the furnace drafts upon the movement of said balance lever.

9. In a mechanism of the character described, in combination, a furnace, dampers therefor, a pressure operated means, of a fulcrumed lever operated upon by the pressure operated means, a compensating weight operating upon the lever on one side of the fulcrum thereof, and comprising an arm having a slidable weight thereon, a second counterbalancing weight upon the balance lever on the other side of the fulcrum, the latter weight being adapted to be moved to overbalance the compensating weight, connections between the balance lever and the dampers, connections between the slidable weight on the compensating weight, and the second counterbalance weight, mechanism operating upon the second weight to permit it to be moved on the balance lever, through its connections with the weight, on the compensating weight, to restore the balance of the balance lever, and a suitable stop for limiting the movement of the second weight.

10. In a mechanism of the character described, a lever, a pressure operated device which operates upon the lever, dampers, flexible connections between the lever and dampers, means for maintaining the lever in sensitive balanced condition irrespective of pressure, a timing mechanism, a weight mounted on said lever, and means for establishing temporary coöperation between the weight and the timing mechanism, whereby the weight is permitted to change its position automatically on the lever to restore the lever to sensitive balanced condition.

11. In a mechanism of the character described, a lever, a pressure operated device which operates upon the lever, dampers, flexible connections between the lever and dampers, a pressure determining weight on the lever, a compensating weight for maintaining the lever in sensitive balanced condition irrespective of the pressure, a timing mechanism, and means for establishing temporary coöperation between the weight and timing mechanism, whereby the weight is permitted to change its position automatically on the lever to restore said lever to sensitive balanced condition.

In testimony whereof I affix my signature in presence of two witnesses.

WILLIAM E. SHORE.

Witnesses:
JOHN HAZEN,
H. C. STINNER.